No. 784,402. PATENTED MAR. 7, 1905.
O. HUTZLER.
AUTOMATICAL COOKING APPARATUS.
APPLICATION FILED APR. 29, 1903.

WITNESSES:
Henry J. Suhrbier.
Frank E. Boyce

INVENTOR
Otto Hutzler
BY Goepel & Vilas
ATTORNEYS.

No. 784,402.  
Patented March 7, 1905.

UNITED STATES PATENT OFFICE.

OTTO HUTZLER, OF ZURICH, SWITZERLAND.

AUTOMATICAL COOKING APPARATUS.

SPECIFICATION forming part of Letters Patent No. 784,402, dated March 7, 1905.

Application filed April 29, 1903. Serial No. 154,829.

*To all whom it may concern:*

Be it known that I, OTTO HUTZLER, a citizen of the Republic of Switzerland, residing in Zurich, Switzerland, have invented certain new and useful Improvements in Cooking Apparatus, of which the following is a specification.

This invention relates to cooking apparatus, and has for its object to provide means by which victuals after having been heated approximately to their boiling-point on suitable heating means are cooked to a finish separate from the heating means, and consequently without the expenditure of a continuous supply of fuel.

For this purpose the invention consists of a heat-insulating case or receptacle and a heat retainer or accumulator, which is heated at the same time with the vessel in which the victuals are heated and then placed within the vessel or insulated case or receptacle, this combination being adapted to complete the cooking of the partially-cooked food without the use of fuel in as quick a manner as is attained in the ordinary way heretofore, necessitating constant replenishing of fuel, as will be more fully described hereinafter and finally pointed out in the claims.

Figure 1:
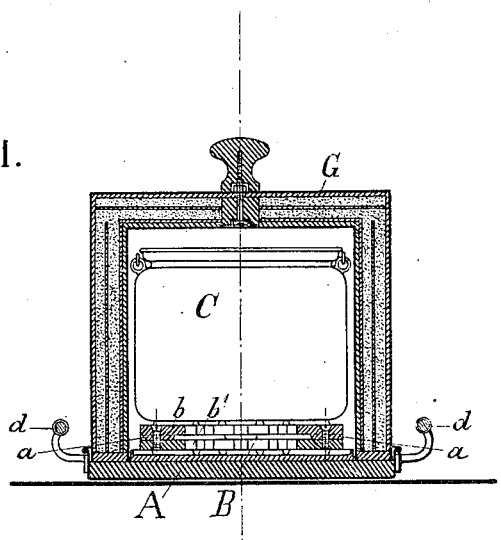
Figure 2:
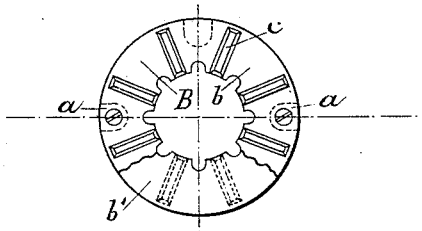
Figure 3:
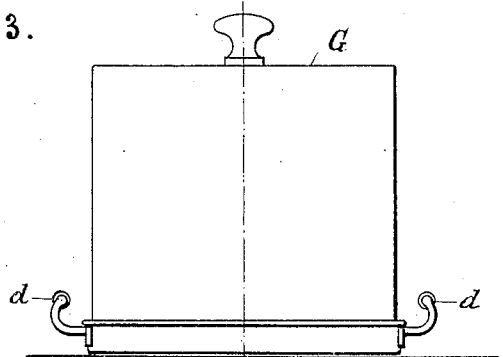

In the accompanying drawings, Figure 1 is a vertical central section of my improved cooking apparatus. Fig. 2 is a horizontal transverse section of the same, showing the heat-retaining body or accumulator; and Fig. 3 is an elevation of a cylindrical form of my improved cooking apparatus.

Similar letters of reference indicate corresponding parts.

Referring to the drawings, A represents a base-plate made of suitable material non-conductive of heat, provided with handles $d$. Corresponding to the base-plate A a cover G, also of suitable material non-conductive of heat, is provided, which together with the base-plate forms the heat-insulating case or receptacle  Interposed between the vessel C and the base-plate A is a heat-retaining body or accumulator B, which consists of several metal rings or disks $b\ b'$, one above the other and separated by projections $a$. These rings or disks are perforated and provided with ribs $c$, so as to permit ample passage of heat through the disks and at the same time minimum contact of the disks with the vessel adapted for culinary purposes. The receptacle, which is preferably cylindrical, may be made of any suitable size, so as to inclose either one or more culinary vessels.

The procedure of my improved cooking apparatus is as follows: The accumulator B, together with the vessel, is heated, whereby the heat passes through the perforations of the disks of the heat-retaining body or accumulator and, due to the small contact of the ribs of the accumulator, causes an efficient and ample contact with the vessel. When the victuals in the vessel are heated to their boiling-point, the heat-retaining body or accumulator, together with the vessel, is placed on the base-plate A and covered by the cover G, which thereby incloses the vessel and the accumulator and prevents the escape of heat from the same. The heat acquired in the accumulator during the heating of the same, together with the vessel, is gradually given off by radiation to the vessel, and as all heat is prevented from escaping from the receptacle, owing to its high insulating properties, the food in the vessel is subjected to all the heat of the accumulator. By these means it has been found that it is only necessary to heat the food in a suitable vessel up to its boiling-point and then place the vessel, together with the accumulator, as described, in the heat-insulating receptacle, whereby the cooking of food will be finished in the same time as it required for the cooking of the same on the ordinary heating means heretofore, which required constant replenishing of fuel.

I claim as new and desire to secure by Letters Patent—

1. A cooking apparatus, comprising a base-plate of suitable material non-conductive of heat, a culinary vessel, a heat-retaining body consisting of a plurality of disks, detachably interposed between the vessel and the base-plate, and adapted to be heated with the vessel, and a cover inclosing said vessel and heat-retaining body, substantially as described.

2. In a cooking apparatus, the combination with a base-plate of suitable material non-conductive of heat, a cover therefor also of suitable material non-conductive of heat, a culinary vessel, and a heat-retaining body consisting of a plurality of perforated disks provided with ribs, adapted to be heated with the vessel and interposed between the vessel and base-plate when inclosed by the cover, substantially as set forth.

3. In a cooking apparatus, the combination of a culinary vessel, a heat-retaining body consisting of a plurality of disks, and means, of suitable material non-conductive of heat, inclosing said vessel and heat-retaining body.

In testimony that I claim the foregoing as my invention I have signed my name in presence of two subscribing witnesses.

OTTO HUTZLER.

Witnesses:
 ANTON JUNGE,
 A. LIEBERKNECHT.